United States Patent
Boettcher

(10) Patent No.: US 7,102,806 B2
(45) Date of Patent: Sep. 5, 2006

(54) PRESSURE SENSITIVE DEFORMABLE MIRROR

(75) Inventor: Christian Boettcher, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/722,362

(22) Filed: Nov. 26, 2003

(65) Prior Publication Data
US 2005/0002078 A1    Jan. 6, 2005

(30) Foreign Application Priority Data
Nov. 29, 2002   (EP)   ................... 02026664

(51) Int. Cl.
*G02B 26/08*   (2006.01)
(52) U.S. Cl. ........................ 359/224; 359/846
(58) Field of Classification Search ............... 359/224, 359/225, 226, 845, 846
See application file for complete search history.

(56) References Cited

U.S. PATENT DOCUMENTS

| 4,783,155 A | 11/1988 | Imataki |
| 4,932,768 A | 6/1990 | Gobeli |
| 5,020,895 A | 6/1991 | Giesen et al. |
| 5,148,324 A * | 9/1992 | Van Amstel ................. 359/871 |
| 6,425,671 B1 * | 7/2002 | Adler et al. ................. 359/846 |

FOREIGN PATENT DOCUMENTS

| DE | 34 24 068 | 5/1985 |
| DE | 39 00 467 | 7/1990 |
| DE | 196 28 672 | 1/1998 |
| DE | 100 01 900 | 8/2001 |
| DE | 100 52 249 | 4/2002 |
| EP | 0 291 596 | 11/1988 |

\* cited by examiner

*Primary Examiner*—Euncha P. Cherry
(74) *Attorney, Agent, or Firm*—Fish & Richardson P.C.

(57) ABSTRACT

A deformable mirror includes a reflecting surface disposed on a diaphragm and a diaphragm carrier that supports the diaphragm. The diaphragm carrier defines a non-circular, pressurizable rear surface of the diaphragm.

17 Claims, 2 Drawing Sheets

PRESSURE SENSITIVE DEFORMABLE MIRROR

CLAIM OF PRIORITY

This application claims priority under 35 USC § 119(a) to European Patent application number No. 02026664, filed on Nov. 29, 2002, the entire contents of which are hereby incorporated by reference.

TECHNICAL FIELD

This disclosure relates a mirrors used in a laser-processing machine, and more particularly to a mirror plate diaphragm.

BACKGROUND

Reflecting mirrors can have different shapes in order to achieve different focal lengths, and some mirrors have deformable shapes to achieve a variable focal length.

German Patent No. DE 100 01 900 A1 discloses a deformable mirror with a mirror disk and an actuator that engages concentrically on the rear side of the mirror surface. The actuator acts on a ring that is disposed behind the mirror disk and is preferably formed integrally with the mirror disk. The sphere of the mirror surface can be influenced by the cross-sectional geometrical shape of the ring and also by a centrally symmetrical weakening of the mirror disk and by static overpressure of a fluid-filled chamber behind the mirror disk.

According to the technical teaching of German Patent No. DE 39 00 467 A1, the rear side of a mirror can have a cavity and this cavity is pressurized with a larger or smaller pressure to change the geometrical shape of the mirror thereby.

In a deformable mirror according to the teaching of German Patent No. DE 100 52 249 A1, the deformable mirror element is coolable by a medium when used as a laser beam guiding component with a housing with associated mirror element.

Spherical optical elements, such as lenses or mirrors, can only focus beams close to the optical axis with a small imaging error because increasing axial separation increases imaging errors due to spherical aberration. Moreover, increasing separation and enlargement of the angle to the optical axis produces astigmatism.

One known possibility to reduce these imaging errors is to use an additional deflection mirror. As shown in FIG. 5, a generated laser beam 17 can reflect off of a circular reflecting surface of a mirror 18 that can be deformed by pressurization. An additional deflection mirror 19 is required to guide the laser beam 17 at a small angle to the adaptive mirror 18. Two mirrors are required to obtain adjustable focusing of the laser beam in the processing head of the laser-processing machine.

An imaging mirror requires aspherical deformations of the reflecting surface of the mirror for large beam deflecting angles (from the optical axis), in particular 90° deflections, in contrast to spherical mirrors, wherein the aspherical deformations can be generated (e.g., by adaptive mirrors having an elliptical or oval reflecting surface which can be loaded with pressure). Mirrors of this type are demanding to realize.

SUMMARY

In a first general aspect, a deformable mirror includes a reflecting surface disposed on a diaphragm and a diaphragm carrier that supports the diaphragm. The diaphragm carrier defines a non-circular, pressurizable rear surface of the diaphragm.

In another general aspect, a method of reflecting a laser beam includes directing the laser beam onto a deformable, reflecting surface, supported by a pressurizable diaphragm and altering a pressure within a diaphragm carrier that supports the diaphragm to deform the shape of the diaphragm and the reflecting surface, where the diaphragm carrier defines a non-circular pressurizable, rear surface of the diaphragm.

One or more of the following features can be included. For example, the rear surface can be an approximately rectangular surface, an approximately oval surface, or an approximately elliptical surface. The diaphragm carrier can includes a lateral recess substantially parallel to the reflecting surface and adjacent to the rear surface of the diaphragm. A cooling fluid can be contact with the rear surface of the diaphragm. A pressure of the cooling fluid can be different from a pressure on the reflecting surface, such that the shape of the reflecting surface is deformed. The pressure of the cooling fluid can be altered. The deformable mirror can include an actuator for pressurizing the rear side of the diaphragm. The actuator can be actuated to apply pressure to the rear surface of the diaphragm. The diaphragm carrier can be a pipe socket with circular outer cross-section.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
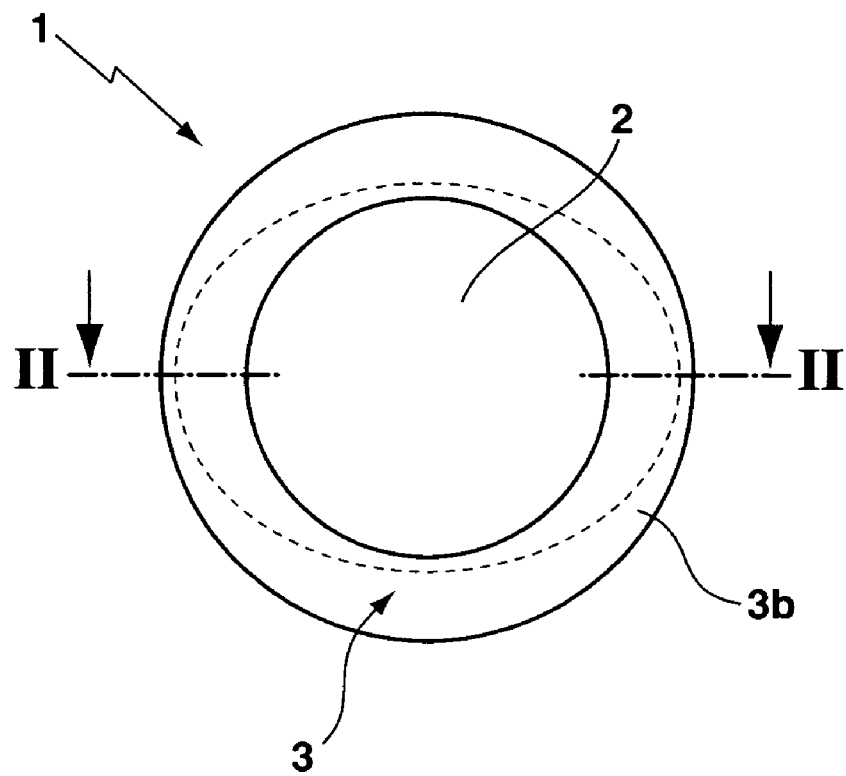
FIG. 1 is a bottom view of the lower side of a mirror of a laser-processing machine.

FIG. 1 shows the structure of an adaptive mirror 1 of a known laser-processing machine (not shown). As used herein, adaptive and deformable means aspherical deformation of the mirror plate diaphragm 2, which can be precisely varied and adjusted. Adaptive mirrors 1 of this type can be used for large beam deflection angles in accordance with the invention.

The mirror 1 includes, in addition to the deformable mirror plate diaphragm 2, a diaphragm carrier 3 that is substantially formed by a pipe socket 3a (cylinder) and a transition region 3b and represents a connecting piece for mounting the mirror 1 to the laser-processing machine. The pipe socket 3a, transition region 3b and mirror disk diagram 2 together form a one-piece component in which the mirror plate diaphragm 2 is integrated in the diaphragm carrier 3 (i.e., the mirror plate diaphragm 2 is mechanically rigidly clamped or connected to the diaphragm carrier 3).

Because the mirror plate diaphragm 2 is made from a deformable material (e.g., rubber), a curvature of the diaphragm 2 can be adjusted from slightly concave to flat to slightly convex. The mirror 1 can be used simultaneously to adjust the focus and deflect the laser beam in the processing head of the laser-processing machine.

Figure 2:
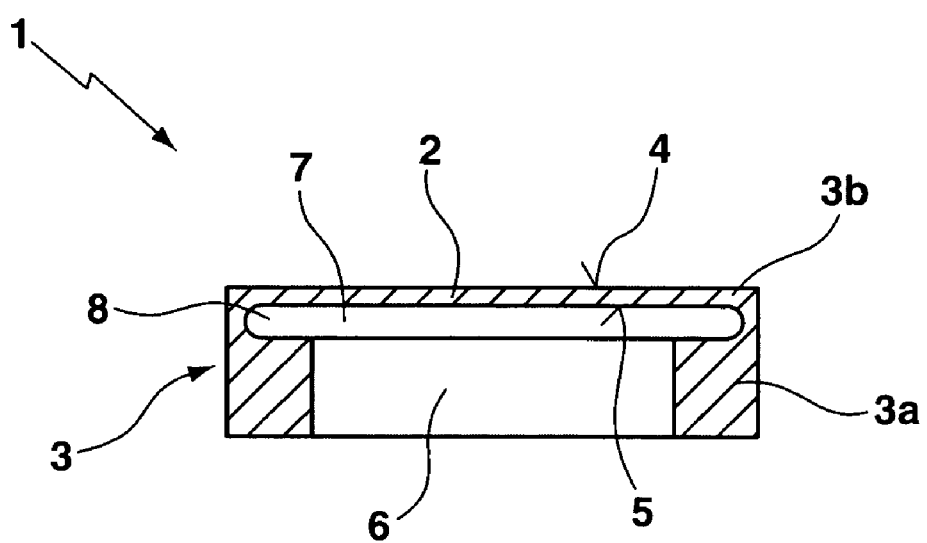
FIG. 2 is a side view of the mirror of FIG. 1 along line II—II of FIG. 1.

To obtain the above-mentioned properties of the mirror 1, the rear side of the mirror plate diaphragm 2 can be pressurized. For a pressure load, an approximately elliptical surface of the mirror plate diaphragm 2 is provided. The surface that can be pressurized is generated by milling under (i.e., countersinking) the mirror plate diaphragm 2 or through milling out a recess 8 of the pipe socket 3a below the mirror plate diaphragm 2. The milled structure is shown in FIG. 2.

A first mirror interior (cavity) 6 with a circular cross-section merges into a second mirror interior 7 with elliptical cross-section. The diaphragm carrier 3 can be flanged to further components of the laser-processing machine through which, for example, cooling water can be fed into the mirror interiors 6 and 7. In addition to cooling of the mirror plate diaphragm 2, the diaphragm rear side 5 is also pressurized. The mirror interior 7 can be filled with cooling water or another fluid such that the elliptical surface of the mirror plate diaphragm 2 can be precisely pressurized.

Thus, a mirror plate diaphragm 2 and a diaphragm carrier 3 define in the region of the diaphragm rear side an approximately elliptical or approximately rectangular or oval surface of the diaphragm rear side which can be pressurized. Diaphragm carrier 3 and mirror plate diaphragm 2 can be rigidly interconnected and form a one-piece component. Definition of the approximately elliptical or approximately rectangular or oval surface by the diaphragm carrier produces an adaptive mirror with an aspherical deformation, which may be used for deflecting a laser beam through relatively large deflection angles when this region of the diaphragm rear side is pressurized.

Milling or countersinking of the diaphragm carrier 3 in a particular shape accomplishes of the approximately elliptical or oval surface on the diaphragm 2 irrespective of the geometrical shape of the diaphragm carrier 3, which can be, for example, annular and/or circular. When the diaphragm carrier has a circular connecting piece (e.g., a pipe socket), the mirror can be easily flanged to existing components of a beam guidance.

The approximately elliptical or approximately rectangular or oval surface for the mirror plate diaphragm 2 can be pressurized with cooling water, or by another cooling fluid, or by an mechanical actuator.

Additional aspherical curvatures (which exceed the curvature of the adaptive function) of the reflecting surface 4 of the mirror plate diaphragm 2 can be formed or embossed.

The mirror plate diaphragm 2 is thereby subjected to thickness variations. This version is suited for applications requiring larger curvatures (convex and also concave). The mirror plate diaphragm 2 need not necessarily be flat, but different curvatures can be obtained by using precise variations in thickness of the diapgragm. The reflecting surface 4 of the mirror 1 can have a macroscopically predetermined curvature, such that the laser beam is focused. Furthermore, the focus can be adjusted through pressurization of the elliptical surface of the diaphragm rear side 5 (e.g., by cooling water) and the resulting adaptation of the mirror surface. A predetermined macroscopic curvature of the reflecting surface of the mirror produces, in connection with the adjustable pressurization of an approximately elliptical or rectangular or oval region of the mirror plate diaphragm, an advantageous combination of focusing mirror and an adjustable focus mirror.

Figure 3:
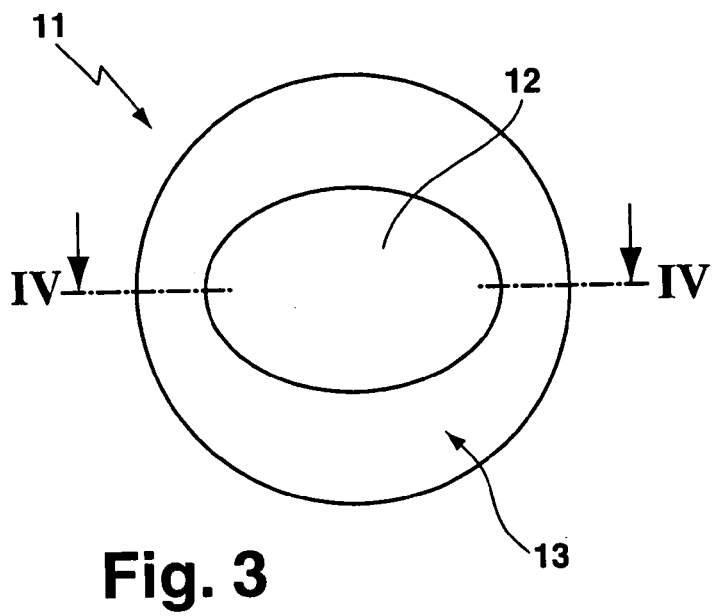
FIG. 3 is a bottom view of the lower side of a second inventive mirror of a laser-processing machine.
Figure 4:
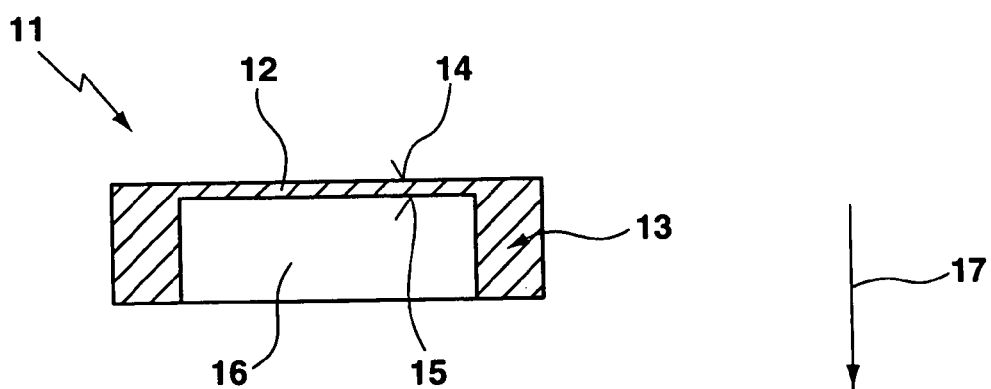
FIG. 4 is a side view of the mirror of FIG. 3 along line IV—IV of FIG. 3.
Figure 5:
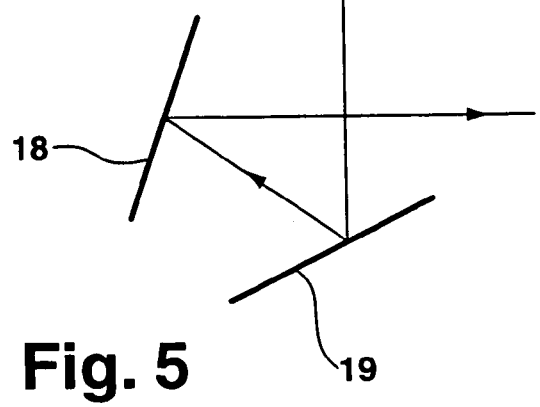
FIG. 5 is a schematic diagram of a beam guidance of a laser-processing machine.

FIGS. 3 and 4 show an alternative design of a mirror plate diaphragm 12 of a mirror 11 having an elliptical surface. A diaphragm carrier 13, which has a circular outside diameter, is connected in one piece with the mirror plate diaphragm 12 and delimits the inside a mirror plate diaphragm 12 to a non-circular surface (e.g., an elliptical surface, a rectangular surface, or an oval surface). The laser beam is deflected by a reflecting mirror surface 14. A diaphragm rear side 15 can be pressurized when one single mirror interior 16 is filled with cooling water.

Thus, an adaptive aspherical mirror that is easy to produce and that deflects a laser beam by large angles (e.g., 90°), such that the imaging error produced during deflection is small, is provided.

OTHER EMBODIMENTS

A number of embodiments of the invention have been described. Nevertheless, it will be understood that various modifications may be made. Accordingly, other embodiments are within the scope of the following claims.

What is claimed is:

1. A deformable mirror comprising:
   a reflecting surface disposed on a diaphragm;
   a diaphragm carrier that supports the diaphragm, wherein the diaphragm carrier has a circular perimeter and a countersunk portion that defines a non-circular, pressurizable rear surface of the diaphragm; and
   wherein the rear surface is an approximately rectangular surface, an approximately oval surface, or an approximately elliptical surface, and wherein the rear surface is configured to enable variable aspherical deformation of the reflecting surface.

2. The deformable mirror of claim 1, wherein the rear surface is an approximately rectangular surface.

3. The deformable mirror of claim 1, wherein the rear surface is an approximately oval surface.

4. The deformable mirror of claim 1, wherein the rear surface is an approximately elliptical surface.

5. The deformable mirror of claim 1, wherein the diaphragm carrier comprises a lateral recess substantially parallel to the reflecting surface and adjacent to the rear surface of the diaphragm.

6. The deformable mirror of claim 1, further comprising a cooling fluid in contact with the rear surface of the diaphragm.

7. The deformable mirror of claim 6, wherein a pressure of the cooling fluid is different from a pressure on the reflecting surface, such that the shape of the reflecting surface is deformed.

8. The deformable mirror of claim 1, further comprising an actuator for pressurizing the rear side of the diaphragm.

9. The deformable mirror of claim 1, wherein the diaphragm carrier comprises a pipe socket with circular outer cross-section.

10. A method of reflecting a laser beam, the method comprising:
   directing the laser beam onto a deformable, reflecting surface, supported by a pressurizable diaphragm; and
   variably altering a pressure within a diaphragm carrier that supports the diaphragm to aspherically deform the shape of the diaphragm and the reflecting surface, wherein the diaphragm carrier has a circular perimeter and a countersunk portion that defines a non-circular, pressurizable rear surface of the diaphragm, and wherein the rear surface is an approximately rectangular surface, an approximately oval surface, or an approximately elliptical surface.

11. The method of claim 10, wherein the rear surface is an approximately rectangular surface.

12. The method of claim 10, wherein the rear surface is an approximately oval surface.

13. The method of claim 10, wherein the rear surface is an approximately elliptical surface.

14. The method of claim 13, further comprising providing a cooling fluid in contact with the rear surface of the diaphragm.

15. The method of claim 14, further comprising altering a pressure of the cooling fluid.

16. The method of claim 10, further comprising actuating an actuator to apply pressure to the rear surface of the diaphragm.

17. The method of claim 10, wherein the diaphragm carrier is a pipe socket with circular outer cross-section.

* * * * *